US012729909B2

(12) United States Patent
Chen et al.

(10) Patent No.: US 12,729,909 B2
(45) Date of Patent: Sep. 8, 2026

(54) ELECTRODE SHEET OVEN DRYING APPARATUS, BATTERY PRODUCTION DEVICE, AND ELECTRODE SHEET OVEN DRYING METHOD

(71) Applicant: CONTEMPORARY AMPEREX TECHNOLOGY (HONG KONG) LIMITED, Hong Kong (CN)

(72) Inventors: Shengdong Chen, Ningde (CN); Lei Song, Ningde (CN); Qiang Liu, Ningde (CN); Chen Li, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 566 days.

(21) Appl. No.: 18/348,681

(22) Filed: Jul. 7, 2023

(65) Prior Publication Data

US 2023/0417483 A1 Dec. 28, 2023

Related U.S. Application Data

(63) Continuation of application No. PCT/CN2023/085005, filed on Mar. 30, 2023.

(30) Foreign Application Priority Data

Jun. 24, 2022 (CN) ......................... 202221589185.0

(51) Int. Cl.
*F26B 3/04* (2006.01)
*F26B 21/00* (2026.01)
(Continued)

(52) U.S. Cl.
CPC .............. *F26B 3/04* (2013.01); *F26B 21/006* (2013.01); *F26B 21/20* (2026.01); *F26B 21/33* (2026.01);
(Continued)

(58) Field of Classification Search
CPC .. F26B 3/04; F26B 21/20; F26B 21/50; F26B 21/37; F26B 21/33; F26B 21/006;
(Continued)

(56) References Cited

U.S. PATENT DOCUMENTS 10,199,635 B2 * 2/2019 Ho ............................ F26B 3/04
2005/0048861 A1 * 3/2005 Kifune ...................... F27B 9/10 445/6

FOREIGN PATENT DOCUMENTS

CN 201837217 U 5/2011
CN 110742297 A 2/2020
(Continued)

OTHER PUBLICATIONS

The World Intellectual Property Organization (WIPO) International Search Report and Written Opinion for PCT/CN2023/085005 Jul. 13, 2023 18 pages (Including English translation).
(Continued)

*Primary Examiner* — Deming Wan
(74) *Attorney, Agent, or Firm* — ANOVA LAW GROUP, PLLC

(57) ABSTRACT

An electrode sheet oven drying apparatus includes an oven provided with an oven drying chamber, an oven drying assembly positioned in the oven drying chamber, an air discharge pipe connected to the oven drying chamber, a first air volume regulating valve installed at one end of the air discharge pipe connected to the oven drying chamber, a humidity detection module installed in the oven drying chamber and configured to detect a humidity in the oven drying chamber, and a control module communicatively connected to the humidity detection module and configured to regulate the first air volume regulating valve according to the humidity in the oven drying chamber.

10 Claims, 2 Drawing Sheets

(51) Int. Cl.

| | |
|---|---|
| ***F26B 21/02*** | (2006.01) |
| ***F26B 21/10*** | (2006.01) |
| ***F26B 21/12*** | (2006.01) |
| ***F26B 21/20*** | (2026.01) |
| ***F26B 21/33*** | (2026.01) |
| ***F26B 21/37*** | (2026.01) |
| ***F26B 21/50*** | (2026.01) |
| ***F26B 25/06*** | (2006.01) |
| ***F26B 25/14*** | (2006.01) |
| *H01M 4/88* | (2006.01) |

(52) U.S. Cl.
CPC .............. *F26B 21/37* (2026.01); *F26B 21/50* (2026.01); *F26B 25/14* (2013.01); *H01M 4/88* (2013.01)

(58) Field of Classification Search
CPC ........ F26B 21/02; F26B 21/004; F26B 21/12; F26B 21/10; F26B 25/14; F26B 25/06; F26B 13/004
USPC ............................................................ 34/529
See application file for complete search history.

(56) References Cited

FOREIGN PATENT DOCUMENTS

| | | | |
|---|---|---|---|
| CN | 112432446 | A | 3/2021 |
| CN | 114146879 | A | 3/2022 |
| CN | 217330617 | U | 8/2022 |
| GB | 1513850 | A | 6/1978 |
| JP | H0550023 | A | 3/1993 |
| KR | 20210050721 | A | 5/2021 |

OTHER PUBLICATIONS

The China National Intellectual Property Administration (CNIPA) Notice of Grant of Utility Model Patent Rights for CN Application No. 202221589185.0 Jun. 30, 2023 2 Pages (Including English translation).
State Intellectual Property Office of China Notice of Grant of Utility Model Patent for Application No. 202221589185.0 Jun. 30, 2022 2 pages (including translation).
The European Patent Office (EPO) The Extended European Search Report for Application No. 23733831.4, Sep. 30, 2024 6 Pages.

* cited by examiner

ELECTRODE SHEET OVEN DRYING APPARATUS, BATTERY PRODUCTION DEVICE, AND ELECTRODE SHEET OVEN DRYING METHOD

CROSS-REFERENCE TO RELATED APPLICATIONS

The present application is a continuation of International Application No. PCT/CN2023/085005, filed on Mar. 30, 2023, which claims priority to Chinese patent application No. 202221589185.0 filed on Jun. 24, 2022 and entitled “ELECTRODE SHEET OVEN DRYING APPARATUS AND BATTERY PRODUCTION DEVICE,” which are incorporated herein by reference in their entirety.

TECHNICAL FIELD

The present application relates to the technical field of battery production, and in particular relates to an electrode sheet oven drying apparatus, a battery production device, and an electrode sheet oven drying method.

BACKGROUND ART

With energy saving and emission reduction being the key to sustainable development of automobile industry, electric vehicles become an important part of the sustainable development of automobile industry due to their advantages of energy saving and environmental protection. For electric vehicles, battery technology is an important factor related to their development.

In a manufacturing process of batteries, moisture control is one of important factors affecting the quality and performance of batteries. Therefore, in a preparation process of batteries, it is needed to not only strictly control the environmental humidity in a production workshop, but also dry electrode sheets, battery coils, or battery stacks using an oven.

However, in some cases, due to structural defects of an oven, the humidity inside the oven cannot be monitored and automatically regulated, thus affecting the drying effect of electrode sheets.

SUMMARY

Based on the above description, it is needed to provide an electrode sheet oven drying apparatus, a battery production device, and an electrode sheet oven drying method to solve the problem that the humidity inside an oven cannot be monitored and automatically regulated.

According to a first aspect of the embodiments of the present application, an electrode sheet oven drying apparatus is provided, including:

an oven with an oven drying chamber;

an oven drying assembly positioned in the oven drying chamber;

an air discharge pipe connected to the oven drying chamber;

a first air volume regulating valve installed in the air discharge pipe;

a humidity detection module installed in the oven drying chamber, and configured to detect the humidity in the oven drying chamber; and a control module communicatively connected to the humidity detection module, and configured to regulate the first air volume regulating valve according to the humidity in the oven drying chamber.

According to the embodiments of the present application, the first air volume regulating valve may be regulated in real time according to the humidity level in the oven drying chamber by configuring the first air volume regulating valve, the humidity detection module, and the control module, thereby regulating the volume of steam discharged through the air discharge pipe and achieving real-time regulation of the humidity. Finally, the drying rate of electrode sheets is controlled within an appropriate range to avoid defects caused by too rapid drying of the electrode sheets, or influence on the performance and safety of batteries due to under-drying.

In some embodiments, the oven drying assembly includes an upper compartment and a lower compartment arranged apart, a plurality of first air nozzles being arranged on one side of the upper compartment facing the lower compartment, a plurality of second air nozzles being arranged on one side of the lower compartment facing the upper compartment; and the humidity detection module being positioned between the first air nozzles and the second air nozzles.

By adopting the above solution, the humidity in the oven drying chamber may be detected in time accurately, thereby improving the accuracy of humidity control.

In some embodiments, the electrode sheet oven drying apparatus further includes:

a circulating air pipe with one end connected to the oven drying chamber and the other end connected to the oven drying assembly; and a fresh air pipe with one end connected to the circulating air pipe and the other end communicated to the outside.

By the above solution, a part of steam generated by drying electrode sheets is discharged from the oven drying chamber through the air discharge pipe, while the other part of steam mixes with fresh air in the fresh air pipe through the circulating air pipe and re-enters the oven drying assembly. When air drawn from an accommodating cavity is insufficient, fresh air from the outside can be drawn through the fresh air pipe to maintain the humidity and air pressure stable in the oven drying chamber.

In some embodiments, the electrode sheet oven drying apparatus further includes a second air volume regulating valve installed at one end of the circulating air pipe connected to the oven drying chamber.

By adopting the above solution, the inlet air volume of the circulating air pipe may be accurately regulated, thereby accurately controlling the volume of steam entering the circulating air pipe.

In some embodiments, the electrode sheet oven drying apparatus further includes a third air volume regulating valve installed in the fresh air pipe.

By adopting the above solution, the inlet fresh air volume of the fresh air pipe may be accurately regulated, thereby accurately controlling the volume of airflow entering the accommodating cavity through the oven drying assembly.

In some embodiments, the electrode sheet oven drying apparatus further includes a pressure difference detection module communicatively connected to the control module, and the pressure difference detection module is configured to detect the air pressure in the oven drying chamber to control the third air volume regulating valve.

By adopting the above solution, the air pressure in the oven drying chamber may be monitored in real time, and further the third air volume regulating valve may be regulated to regulate the volume of fresh air flowing into the circulating air pipe, thereby maintaining the air pressure stable in the oven drying chamber.

In some embodiments, the pressure difference detection module is provided with a first detection end and a second detection end, the first detection end extending into one end of the air discharge pipe connected to the oven drying chamber, the second detection end extending into one end of the circulating air pipe connected to the oven drying chamber, and the pressure difference detection module being configured to detect the air pressure difference between the end of the air discharge pipe connected to the oven drying chamber and the end of the circulating air pipe connected to the oven drying chamber.

By adopting the above solution, the air pressure changes in the oven drying chamber may be accurately obtained, and adjustments may be made in time to maintain the air pressure stable in the oven drying chamber.

In some embodiments, the electrode sheet oven drying apparatus further includes a circulating fan installed on the circulating air pipe.

By adopting the above solution, a circulating circuit is formed between the oven drying chamber, the circulating air pipe, and the oven drying assembly, which can facilitate internal circulation of a wind field and avoid internal loss, and make the drying atmosphere in the oven drying chamber more uniform, thereby improving the drying efficiency.

In some embodiments, the electrode sheet oven drying apparatus further includes a heating module installed on the circulating air pipe.

By adopting the above solution, an airflow heated by the heating module enters the oven drying assembly, causing a solvent in an electrode sheet to evaporate rapidly.

According to a second aspect of the embodiments of the present application, a battery production device is provided, including the electrode sheet oven drying apparatus in the above embodiment, and further including a coating apparatus positioned upstream of the electrode sheet oven drying apparatus.

According to a third aspect of the embodiments of the present application, an electrode sheet oven drying method is provided, including the following steps:

detecting the humidity in an accommodating cavity; and regulating the volume of steam discharged from the accommodating cavity according to the humidity in the accommodating cavity.

DESCRIPTION OF DRAWINGS

In order to illustrate the technical solutions of the embodiments of the present application more clearly, the following briefly introduces the drawings required in the embodiments of the present application. Obviously, the drawings described below are only some embodiments of the present application. For those of ordinary skill in the art, other drawings may also be obtained according to the drawings without any creative effort. In the drawings.

DESCRIPTION OF REFERENCE NUMERALS

Figure 1:
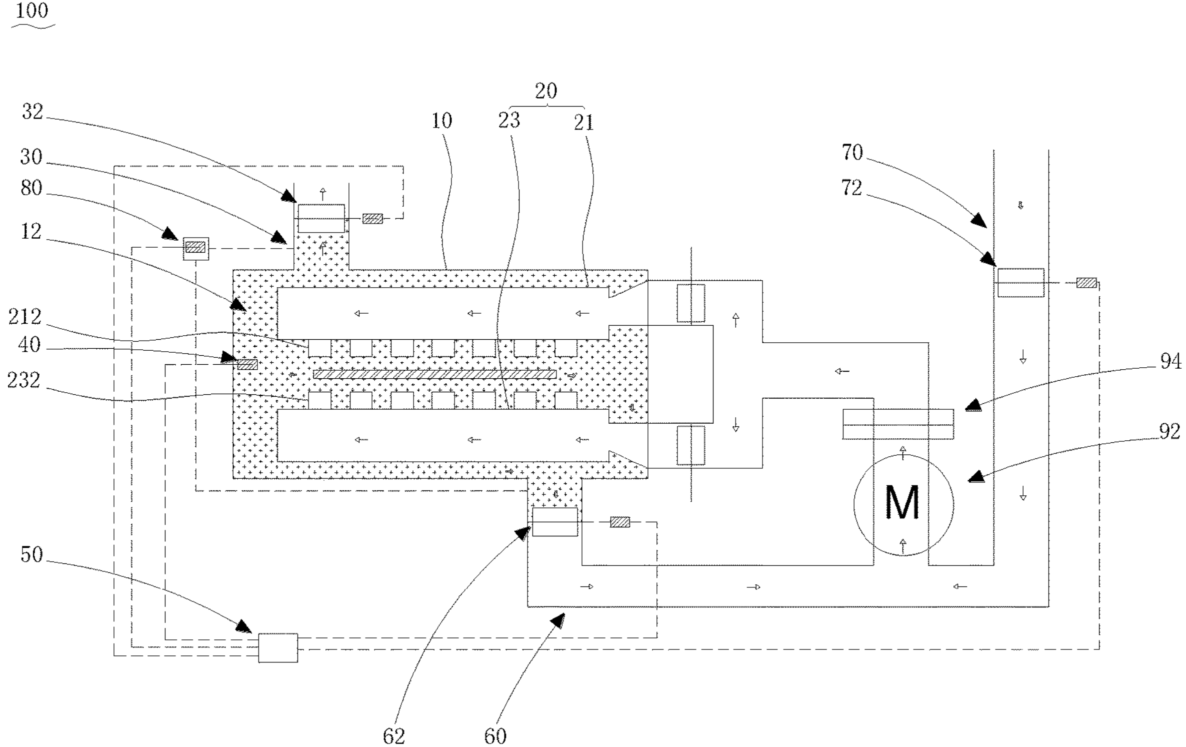
FIG. 1 is a schematic structural diagram of an electrode sheet oven drying apparatus according to the present application.

100. Electrode sheet oven drying apparatus; 10. Oven; 12. Oven drying chamber; 20. Oven drying assembly; 21. Upper compartment; 212. First air nozzle; 23. Lower compartment; 232. Second air nozzle; 30. Air discharge pipe; 32. First air volume regulating valve; 40. Humidity detection module; 50. Control module; 60. Circulating air pipe; 62. Second air volume regulating valve; 70. Fresh air pipe; 72. Third air volume regulating valve; 80. Pressure difference detection module; 92. Circulating fan; 94. Heating module.

DETAILED DESCRIPTION

Embodiments of the technical solutions of the present application will be described in detail below in conjunction with the drawings. The following embodiments are only used for more clearly illustrating the technical solutions of the present application, and therefore are only used as examples and not for limiting the scope of protection of the present application.

Unless otherwise defined, all technical and scientific terms used herein have the same meanings as those commonly understood by those skilled in the technical field of the present application. The terms used herein are intended only for the purpose of describing specific embodiments rather than limiting the present application. The terms "include/comprise" and "have", as well as any variations thereof in the specification, claims, and accompanying drawings of the present application, are intended to cover non-exclusive inclusion.

In the description of the embodiments of the present application, the technical terms "first", "second", and the like are only used for distinguishing different objects and cannot be understood as indicating or implying relative importance or implying the quantity, specific order, or primary and secondary relationship of the indicated technical features. In the description of the embodiments of the present application, the meaning of "a plurality of" refers to two or more, unless otherwise specified.

The reference to "embodiments" herein means that specific features, structures, or characteristics described in combination with the embodiments may be included in at least one embodiment of the present application. The phrase appearing in various parts of the specification does not necessarily refer to the same embodiment, nor is it an independent or alternative embodiment mutually exclusive of other embodiments. It is explicitly and implicitly understood by those skilled in the art that the embodiments described herein may be combined with other embodiments.

In description of the embodiments of the present application, the term "and/or" is only an association relationship for describing associated objects, indicating that three relationships may exist. For example, A and/or B may represent three situations: A exists alone, both A and B exist, and B exists alone. In addition, the character "/" herein generally means that the associated objects before and after it are in an "or" relationship.

In the description of the embodiments of the present application, "a plurality of" means two or more (including two), similarly, "a plurality of groups" means two or more groups (including two groups), and "a plurality of sheets" means two or more sheets (including two sheets).

In the description of the embodiments of the present application, the technical terms "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial", "circumferential" and other indications of orientation or positional relationship are based on the orientation or positional relationship shown in the accompanying drawings, only for the convenience of describing the embodiments of the present application and simplifying the description, rather than indicating or implying that the apparatuses or components referred to must have a specific orientation or be constructed and operated in a specific orientation, and therefore cannot be understood as a limitation on the embodiments of the present application.

In the description of the embodiments of the present application, unless otherwise specified and limited, the technical terms "install", "connect", "link", "fix" and other terms should be understood in a broad sense, for example, it may be a fixed connection, a detachable connection, or an integrated connection; it may also be a mechanical connection or an electrical connection; it may be a direct connection or an indirect connection through an intermediate medium; and it may be an internal communication between two components or an interaction relationship between two components. For those of ordinary skill in the art, the specific meaning of the above terms in the embodiments of the present application may be understood according to specific circumstances.

At present, batteries have the advantages such as high energy density, high working voltage, high safety performance, and long service life, and are widely used in mobile phones, digital cameras and other electronic devices as well as electric vehicles. With the increasing demand for green energy, environmental protection, energy storage and utilization, and the like, batteries have become a bottleneck in development of new energy.

The batteries in the present application may be used as a power source in electrical apparatuses, including but not limited to mobile phones, tablets, laptops, electric toys, electric tools, electric bicycles, electric vehicles, ships, spacecraft, and the like. The electric toys may include fixed or mobile electric toys, e.g., game consoles, electric car toys, electric ship toys and electric aircraft toys. The spacecraft may include aircraft, rockets, space shuttles, spaceships, and the like.

A battery mentioned in the embodiments of the present application refers to a single physical module that includes one or more battery cells to provide higher voltage and capacity. For example, the battery mentioned in the present application may include a battery module or battery pack, and the like. A battery generally includes a box for packaging one or more battery cells. The box may prevent liquid or other foreign matters from affecting charging or discharging of the battery cells.

In the present application, battery cells may include secondary batteries, primary batteries, lithium sulfur batteries, sodium/lithium ion batteries, sodium ion batteries, or magnesium ion batteries, which are not limited in the embodiments of the present application. A battery cell may be cylindrical, flat, rectangular, or in other shapes, which is also not limited in the embodiments of the present application. Battery cells generally include three types according to the packaging manner: cylindrical battery cells, square battery cells, and pouch cells, which are also not limited in the embodiments of the present application.

A battery cell includes an electrode assembly and an electrolyte solution, and the electrode assembly includes positive electrode sheets, negative electrode sheets, and separators. A battery cell works mainly by virtue of metal ions moving between the positive electrode sheets and negative electrode sheets. A positive electrode sheet includes a positive electrode current collector and a positive electrode active material layer. The surface of the positive electrode current collector is coated with the positive electrode active material layer. The positive electrode current collector not coated with the positive electrode active material layer protrudes from the positive electrode current collector coated with the positive electrode active material layer. The positive electrode current collector not coated with the positive electrode active material layer is used as a positive tab. Taking a lithium-ion battery as an example, the material of the positive electrode current collector may be aluminum, and the positive electrode active material may be lithium cobalt oxide, lithium iron phosphate, ternary lithium, lithium manganate, or the like. A negative electrode sheet includes a negative electrode current collector and a negative electrode active material layer. The surface of the negative electrode current collector is coated with the negative electrode active material layer. The negative electrode current collector not coated with the negative electrode active material layer protrudes from the negative electrode current collector coated with the negative electrode active material layer. The negative electrode current collector not coated with the negative electrode active material layer is used as a negative tab. The material of the negative electrode current collector may be copper, and the negative electrode active material may be carbon, silicon, or the like. To prevent fusing when a large current passes, a plurality of positive tabs are stacked together, and also a plurality of negative tabs are stacked together. The material of the separators may be polypropylene (PP), polyethylene (PE), ceramics with a polyvinylidene fluoride (PVDF) coating, or the like.

During production of the aforementioned battery, it is needed to dry wet slurry on an electrode sheet using an oven. The applicant notes that in the related art, the dry state of electrode sheets dried in an oven generally cannot meet the requirement, and is usually over-dried or under-dried. When electrode sheets are in an over-dried state, on the one hand, the energy loss and power consumption of the oven increases, and on the other hand, the electrode sheets are under the risks of demolding, high brittleness, cracking, and the like. When electrode sheets are in an under-dried state, abnormal process conditions may be caused, e.g., the electrode sheets stick to a roller. In addition, in a case that the electrode sheets are under-dried and result in a high water content in a battery cell, the performance and safety of a battery may also be affected. Moreover, if the dryness of the electrode sheets is uneven and non-uniform, the performance of a battery may also be affected.

The applicant has found through research that changes in humidity in an oven may affect the dry state of electrode sheets. In order to solve the problem that the dry state of electrode sheets cannot meet the requirement due to changes in humidity in an oven, the applicant has conducted in-depth research and found that the humidity in an oven may be controlled by configuring a humidity detection module in the oven to meet the requirements for different dry states of electrode sheets. Based on the above consideration, an embodiment of the present application provides an electrode sheet oven drying apparatus, wherein an air discharge pipe, a first air volume regulating valve, a humidity detection module, and a control module are arranged in an oven, the humidity detection module may detect the humidity in the oven, and the control module may regulate the first air volume regulating valve according to the humidity in the oven, thereby discharging a certain volume of steam through the air discharge pipe to regulate the humidity in the oven, and meeting the requirements for different dry states of electrode sheets.

Figure 2:
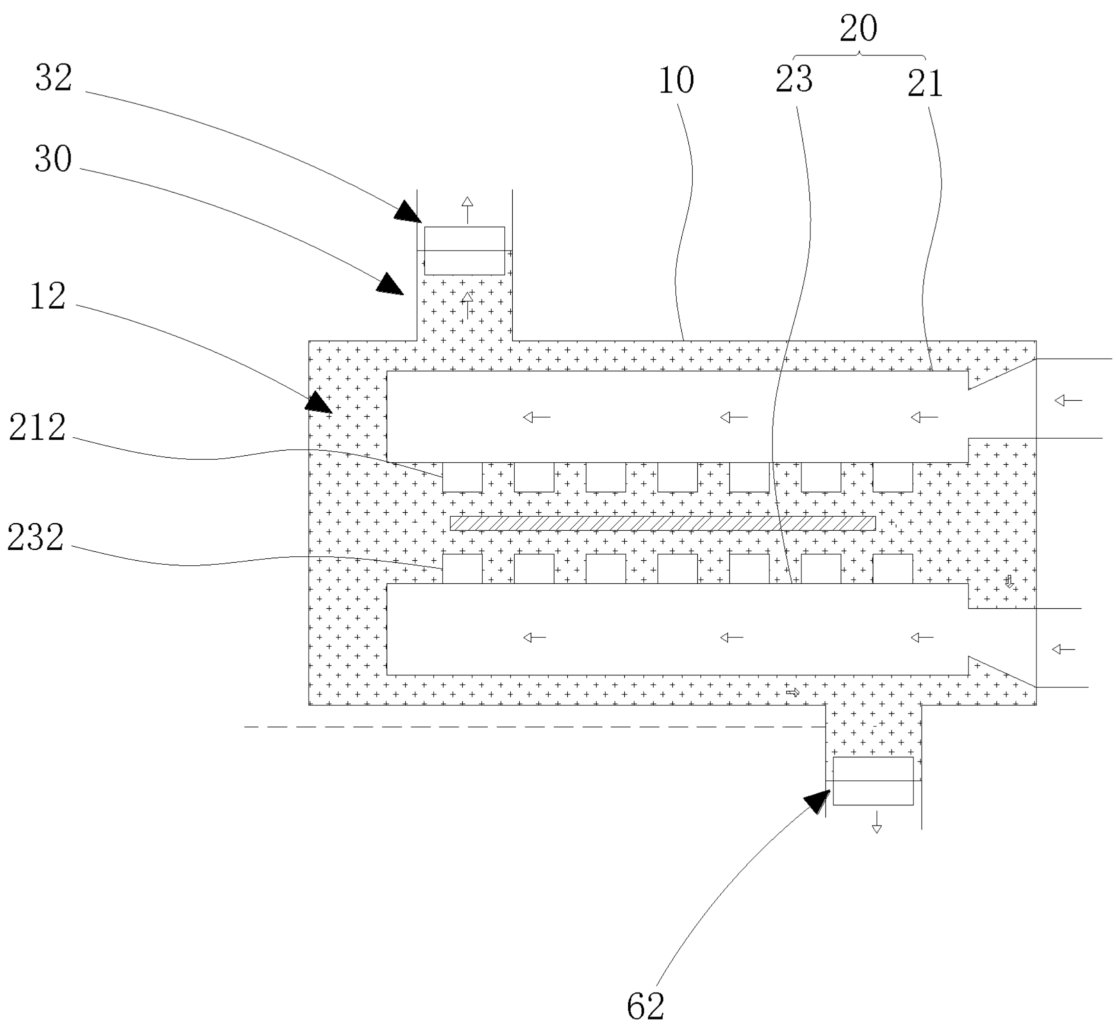
FIG. 2 is a schematic structural diagram of an oven of the electrode sheet oven drying apparatus according to the present application.

As shown in FIGS. 1 and 2, according to some embodiments of the present application, the present application provides an electrode sheet oven drying apparatus 100, including an oven 10, an oven drying assembly 20, an air discharge pipe 30, a first air volume regulating valve 32, a humidity detection module 40, and a control module 50. The oven 10 is provided with an oven drying chamber 12, and the oven drying assembly 20 is positioned in the oven drying chamber 12. The air discharge pipe 30 is connected to the oven drying chamber 12, and the first air volume regulating valve 32 is installed in the air discharge pipe 30. The humidity detection module 40 is installed in the oven drying chamber 12 and configured to detect the humidity in the oven drying chamber 12. The control module 50 is communicatively connected to the humidity detection module 40, and is configured to regulate the first air volume regulating valve 32 according to the humidity in the oven drying chamber 12.

The oven 10 is a cubic hollow shell structure with an oven drying chamber 12 for drying electrode sheets. The oven drying chamber 12 is provided with an oven drying channel extending along a conveying direction of electrode sheets. electrode sheets enter the oven drying chamber 12 from one end of the oven 10 along the oven drying channel, and exit from the other end of the oven 10 after being oven-dried in the oven drying chamber 12. It can be understood that the shape and construction of the oven 10 are not limited, and may be configured as required to meet different drying requirements.

The oven drying assembly 20 is positioned in the oven drying chamber 12 and arranged above and/or below the oven drying channel. The oven drying assembly 20 may blow air to electrode sheets in the oven drying channel to dry the electrode sheets, and a solvent on the electrode sheets evaporates into an accommodating cavity.

An air discharge port communicated with the oven drying chamber 12 is formed at the top of the oven 10, and one end of the air discharge pipe 30 is connected to the oven drying chamber 12 through the air discharge port. Therefore, steam generated by solvent evaporation during the drying process may be discharged from the oven drying chamber 12 through the air discharge pipe 30.

In some embodiments, the first air volume regulating valve 32 is arranged at one end of the air discharge pipe 30 connected to the oven drying chamber 12, and is a gas medium regulating flow element. Regulation of the first air volume regulating valve 32 refers to regulating the opening/closing state and the level of the flow rate of the first air volume regulating valve 32. The larger the flow rate of the first air volume regulating valve 32, the larger the flow channel area, and the greater the flow rate of air passing through the first air volume regulating valve 32 per unit time. The smaller the flow rate of the first air volume regulating valve 32, the smaller the flow channel area, and the smaller the flow rate of air passing through the first air volume regulating valve 32 per unit time. In this way, the volume of steam flowing out of the oven drying chamber 12 through the air discharge pipe 30 may be regulated by regulating the first air volume regulating valve 32.

The humidity detection module 40 may be embedded in the wall of the oven drying chamber 12, or installed on the wall of the oven drying chamber 12 by a mounting bracket. The humidity detection module 40 is a humidity detector configured to detect the humidity in the oven drying chamber 12 and feed back a humidity signal to the control module 50. The control module 50 is configured to regulate the first air volume regulating valve 32 according to the humidity in the oven drying chamber 12. When determining that the humidity is too high, the control module 50 increases the flow rate of the first air volume regulating valve 32 to allow more steam in the oven drying chamber 12 to be discharged through the air discharge pipe 30, thereby reducing the humidity in the oven drying chamber 12. When determining that the humidity is too low, the control module 50 decreases the flow rate of the first air volume regulating valve 32 to reduce the volume of steam discharged through the air discharge pipe 30, thereby increasing the humidity in the oven drying chamber 12.

The first air volume regulating valve 32 may be regulated in real time according to the humidity level in the oven drying chamber 12 by configuring the first air volume regulating valve 32, the humidity detection module 40, and the control module 50, thereby regulating the volume of steam discharged through the air discharge pipe 30 and achieving real-time regulation of the humidity. Finally, the drying rate of electrode sheets is controlled within an appropriate range to avoid defects caused by too rapid drying of the electrode sheets, or influence on the performance and safety of batteries due to under-drying.

According to some embodiments of the present application, the oven drying assembly 20 includes an upper compartment 21 and a lower compartment 23 arranged apart. A plurality of first air nozzles 212 are arranged on one side of the upper compartment 21 facing the lower compartment 23, a plurality of second air nozzles 232 are arranged on one side of the lower compartment 23 facing the upper compartment 21, and the humidity detection module 40 is positioned between the first air nozzles 212 and the second air nozzles 232.

The upper compartment 21 and the lower compartment 23 are arranged apart on opposite sides of the oven drying channel in the vertical direction. A plurality of first air nozzles 212 are arranged apart on a horizontal plane perpendicular to the vertical direction, and each first air nozzle 212 is oriented towards the oven drying channel to blow air towards the electrode sheets to dry the electrode sheets. A plurality of second air nozzles 232 are arranged apart on a horizontal plane perpendicular to the vertical direction, and each second air nozzles 232 is oriented towards the oven drying channel to blow air towards the electrode sheets to dry the electrode sheets. It can be understood that the numbers, arrangements, and tilt angles of the first air nozzles 212 and the second air nozzles 232 are not limited, and may be configured as required to meet different oven drying requirements.

Since the oven drying channel is between the first air nozzles 212 and the second air nozzles 232, the area with the highest humidity in the oven drying chamber 12 is between the first air nozzles 212 and the second air nozzles 232. Therefore, to more accurately detect the humidity in the oven drying chamber 12, the humidity detection module 40 is positioned between the first air nozzles 212 and the second air nozzles 232. It can be understood that the installation position of the humidity detection module 40 is not limited, and the number of (one or more) humidity detection module(s) 40 may also be configured as required.

By arranging the humidity detection module 40 between the first air nozzles 212 and the second air nozzles 232, the humidity in the oven drying chamber 12 may be detected in time accurately, thereby improving the accuracy of humidity control.

According to some embodiments of the present application, the electrode sheet oven drying apparatus 100 further includes a circulating air pipe 60 and a fresh air pipe 70. One end of the circulating air pipe 60 is connected to the oven drying chamber 12, and the other end is connected to the oven drying assembly 20. One end of the fresh air pipe 70 is connected to the circulating air pipe 60, and the other end is communicated to the outside.

A circulating air port is formed at the bottom of the oven drying chamber 12. One end of the circulating air pipe 60 is connected to the oven drying chamber 12 through the circulating air port, and the other end of the circulating air pipe 60 includes a first circulating branch pipe and a second circulating branch pipe. The first circulating branch pipe is connected to the upper compartment 21, and the second circulating branch pipe is connected to the lower compartment 23. In this way, a part of the steam in the oven drying chamber 12 may flow out through the circulating air pipe 60. Then, a part of the steam flows into the upper compartment 21 through the first circulating branch pipe, and finally is blown towards the electrode sheets through the first air nozzles 212. The other part of the steam flows into the lower compartment 23 through the second circulating branch pipe, and finally is blown towards the electrode sheets through the second air nozzles 232.

One end of the fresh air pipe 70 is connected to the middle portion of the circulating air pipe 60, and the other end of the fresh air pipe 70 is connected to the external environment to obtain fresh air. In this way, a part of the steam generated by drying electrode sheets is discharged from the oven drying chamber 12 through the air discharge pipe 30, while the other part of the steam mixes with fresh air in the fresh air pipe 70 through the circulating air pipe 60 and re-enters the oven drying assembly 20. When air drawn from an accommodating cavity is insufficient, fresh air from the outside can be drawn through the fresh air pipe 70 to maintain the humidity and air pressure stable in the oven drying chamber 12.

According to some embodiments of the present application, the electrode sheet oven drying apparatus 100 further includes a second air volume regulating valve 62 installed in the circulating air pipe 60.

In some embodiments, the second air volume regulating valve 62 is arranged at one end of the circulating air pipe 60 connected to the oven drying chamber 12, and is a gas medium regulating flow element. The volume of steam flowing out of the oven drying chamber 12 through the circulating air pipe 60 may be regulated by regulating the second air volume regulating valve 62. Regulation of the second air volume regulating valve 62 refers to regulating the opening/closing state and the level of the flow rate of the second air volume regulating valve 62. The larger the flow rate of the second air volume regulating valve 62, the larger the flow channel area, and the greater the flow rate of air passing through the second air volume regulating valve 62 per unit time. The smaller the flow rate of the second air volume regulating valve 62, the smaller the flow channel area, and the smaller the flow rate of air passing through the second air volume regulating valve 62 per unit time.

By arranging the second air volume regulating valve 62, the inlet air volume of the circulating air pipe 60 may be accurately regulated, thereby accurately controlling the volume of steam entering the circulating air pipe 60.

According to some embodiments of the present application, the electrode sheet oven drying apparatus 100 further includes a third air volume regulating valve 72 installed in the fresh air pipe 70.

In some embodiments, the third air volume regulating valve 72 is arranged at one end of the fresh air pipe 70 far from the oven drying chamber 12, and is a gas medium regulating flow element. The volume of air flowing into the circulating air pipe 60 through the fresh air pipe 70 may be regulated by regulating the third air volume regulating valve 72. Regulation of the third air volume regulating valve 72 refers to regulating the opening/closing state and the level of the flow rate of the third air volume regulating valve 72. The larger the flow rate of the third air volume regulating valve 72, the larger the flow channel area, and the greater the flow rate of air passing through the third air volume regulating valve 72 per unit time. The smaller the flow rate of the third air volume regulating valve 72, the smaller the flow channel area, and the smaller the flow rate of air passing through the third air volume regulating valve 72 per unit time.

By arranging the third air volume regulating valve 72, the inlet fresh air volume of the fresh air pipe 70 may be accurately regulated, thereby accurately controlling the volume of airflow entering the accommodating cavity through the oven drying assembly 20.

According to some embodiments of the present application, the electrode sheet oven drying apparatus 100 further includes a pressure difference detection module 80 communicatively connected to the control module 50, and the pressure difference detection module 80 is configured to detect the air pressure in the oven drying chamber 12 to control the third air volume regulating valve 72.

The pressure difference detection module 80 may detect the air pressure in the oven drying chamber 12 and feed back the air pressure to the control module 50. The control module 50 may control the flow rate of the third air volume regulating valve 72 according to the air pressure level in the oven drying chamber 12 to regulate the volume of fresh air flowing into the circulating air pipe 60, thereby regulating the flow rate of air entering the oven drying chamber 12 through the oven drying assembly 20.

In some embodiments, when the humidity in the oven drying chamber 12 is too low, the control module 50 controls the flow rate of the first air volume regulating valve 32 to decrease to reduce the discharge volume of steam. In this way, the airflow out of the oven drying chamber 12 through the air discharge pipe 30 decreases, and thus the air pressure in the oven drying chamber 12 increases. To maintain the air pressure stable in the oven drying chamber 12, the control module 50 controls the flow rate of the third air volume regulating valve 72 to decrease. Therefore, the volume of fresh air flowing into the circulating air pipe 60 through the fresh air pipe 70 decreases, and the volume of air entering the oven drying chamber 12 through the oven drying assembly 20 decreases, thereby maintaining the air pressure stable in the oven drying chamber 12. In this way, by arranging the pressure difference detection module 80, the air pressure in the oven drying chamber 12 may be monitored in real time, and further the third air volume regulating valve 72 may be regulated to regulate the volume of fresh air flowing into the circulating air pipe 60, thereby maintaining the air pressure stable in the oven drying chamber 12.

According to some embodiments of the present application, the pressure difference detection module 80 is provided with a first detection end and a second detection end. The first detection end extends into one end of the air discharge pipe 30 connected to the oven drying chamber 12. The second detection end extends into one end of the circulating air pipe 60 connected to the oven drying chamber 12. The pressure difference detection module 80 is configured to detect the air pressure difference between the end of the air discharge pipe 30 connected to the oven drying chamber 12 and the end of the circulating air pipe 60 connected to the oven drying chamber 12.

When the humidity in the oven drying chamber 12 is too low, the control module 50 controls the flow rate of the first air volume regulating valve 32 to decrease to reduce the discharge volume of steam. At this time, the airflow out of the oven drying chamber 12 through the air discharge pipe 30 decreases, the pressure at the end of the air discharge pipe 30 connected to the oven drying chamber 12 decreases, and thus the air pressure difference between the first detection end and the second detection end increases. To maintain the air pressure stable in the oven drying chamber 12, the control module 50 controls the flow rate of the third air volume regulating valve 72 to decrease. Therefore, the volume of fresh air flowing into the circulating air pipe 60 through the fresh air pipe 70 decreases, the pressure at the end of the circulating air pipe 60 connected to the oven drying chamber 12 decreases, and thus the air pressure difference between the first detection end and the second detection end decreases, thereby maintaining the air pressure stable in the oven drying chamber 12.

In this way, by obtaining the difference between the air pressure at the end of the air discharge pipe 30 connected to the oven drying chamber 12 and the air pressure at the end of the circulating air pipe 60 connected to the oven drying chamber 12, the air pressure changes in the oven drying chamber 12 may be accurately obtained, and adjustments may be made in time to maintain the air pressure stable in the oven drying chamber 12.

According to some embodiments of the present application, the electrode sheet oven drying apparatus 100 further includes a circulating fan 92 installed on the circulating air pipe 60.

In some embodiments, in the direction of the airflow, the circulating fan 92 is positioned downstream of the connection between the circulating air pipe 60 and the fresh air pipe 70. The circulating fan 92 may drive the airflows from the end of the circulating air pipe 60 connected to the oven drying chamber 12 and the end of the fresh air pipe 70 connected to the outside towards the oven drying assembly 20. It can be understood that the construction of the circulating fan 92 is not limited and may be configured as required to meet different requirements.

By arranging the circulating fan 92, a circulating circuit is formed between the oven drying chamber 12, the circulating air pipe 60, and the oven drying assembly 20, which can facilitate internal circulation of a wind field and avoid internal loss, and make the drying atmosphere in the oven drying chamber 12 more uniform, thereby improving the drying efficiency.

According to some embodiments of the present application, the electrode sheet oven drying apparatus 100 further includes a heating module 94 installed on the circulating air pipe 60.

The heating module 94 is configured to heat the airflow in the circulating air pipe 60 to increase the airflow temperature. It can be understood that the heating methods of the heating module 94 are not limited, which may be resistance heating, infrared heating, and the like. In this way, an airflow heated by the heating module 94 enters the oven drying assembly 20, causing a solvent on an electrode sheet to evaporate rapidly.

According to some embodiments of the present application, as shown in FIGS. 1 and 2, the present application provides an electrode sheet oven drying apparatus 100, including an oven 10, an oven drying assembly 20, an air discharge pipe 30, a humidity detection module 40, a pressure difference detection module 80, and a control module 50. The oven 10 is provided with an oven drying chamber 12, and an oven drying channel extending along the conveying direction of electrode sheets is formed in the oven drying chamber 12. The oven drying assembly 20 is positioned in the oven drying chamber 12, and includes an upper compartment 21 and a lower compartment 23 positioned on both sides of the drying channel. The upper compartment 21 and the lower compartment 23 are used for blowing air to electrode sheets in the oven drying channel to evaporate the solvent on the electrode sheets. A part of the steam formed by solvent evaporation on the electrode sheets is discharged from the accommodating cavity through the air discharge pipe 30, while the other part of the steam enters the circulating air pipe 60, mixes with the fresh air in the fresh air pipe 70, and is blown to the electrode sheets through the oven drying assembly 20.

During the drying process, the humidity detection module 40 detects the humidity in the accommodating cavity and feeds back the humidity to the control module 50. The control module 50 may control the flow rate of the first air volume regulating valve 32 installed in one end of the air discharge pipe 30 connected to the accommodating cavity according to the humidity in the accommodating cavity, thereby controlling the volume of steam discharged through the air discharge pipe 30 to maintain the humidity in the accommodating cavity within an ideal range. Moreover, the pressure difference detection module 80 may also detect the air pressure in the accommodating cavity and feed back the air pressure to the control module 50. The control module 50 may control the flow rate of the third air volume regulating valve 72 installed in the fresh air pipe 70 according to the air pressure level in the accommodating cavity, thereby maintaining the air pressure in the accommodating cavity within an ideal range.

According to some embodiments of the present application, the present application further provides a battery production device, including the electrode sheet oven drying apparatus 100 as described in any of the above solutions, and is used for producing batteries. The battery production device also includes a coating apparatus positioned upstream of the electrode sheet oven drying apparatus 100, and the coating apparatus is used for coating a substrate with slurry to prepare electrode sheets. The coated electrode sheets enter the electrode sheet oven drying apparatus 100 and are dried to remove moisture from the slurry.

According to some embodiments of the present application, the present application further provides an electrode sheet oven drying method, including the following steps:

S100: detect the humidity in an accommodating cavity.

In some embodiments, the humidity detection module 40 detects the humidity in the accommodating cavity and feeds back the humidity to the control module 50.

S200: regulate the volume of steam discharged from the accommodating cavity according to the humidity in the accommodating cavity.

In some embodiments, the control module 50 may control the flow rate of the first air volume regulating valve 32 installed in one end of the air discharge pipe 30 connected to the accommodating cavity according to the humidity in the accommodating cavity, thereby controlling the volume of steam discharged through the air discharge pipe 30 to maintain the humidity in the accommodating cavity within an ideal range.

Further, the pressure difference detection module 80 may also detect the air pressure in the accommodating cavity and feed back the air pressure to the control module 50. The control module 50 may control the flow rate of the third air volume regulating valve 72 installed in the fresh air pipe 70 according to the air pressure level in the accommodating cavity, thereby maintaining the air pressure in the accommodating cavity within an ideal range.

The above embodiments with specific and detailed descriptions only express several implementations of the present application, and cannot be understood as limiting the scope of the patent application. It should be pointed out that for those of ordinary skill in the art, several modifications and improvements may be made without departing from the concept of the present application, all of which fall within the protection scope of the present application. Therefore, the patent protection scope of the present application should be subject to the appended claims.

What is claimed is:

1. An electrode sheet oven drying apparatus, comprising:

an oven with an oven drying chamber;

an oven drying assembly positioned in the oven drying chamber;

an air discharge pipe connected to the oven drying chamber;

a first air volume regulating valve installed in the air discharge pipe;

a humidity detection module installed in the oven drying chamber, and configured to detect a humidity in the oven drying chamber;

a control module communicatively connected to the humidity detection module, and configured to regulate the first air volume regulating valve according to the humidity in the oven drying chamber;

a circulating air pipe with one end connected to the oven drying chamber and another end connected to the oven drying assembly; and a pressure difference detection module communicatively connected to the control module, and provided with a first detection end and a second detection end, the first detection end extending into one end of the air discharge pipe connected to the oven drying chamber, the second detection end extending into one end of the circulating air pipe connected to the oven drying chamber, and the pressure difference detection module being configured to detect an air pressure difference between the end of the air discharge pipe connected to the oven drying chamber and the end of the circulating air pipe connected to the oven drying chamber.

2. The electrode sheet oven drying apparatus according to claim 1, wherein:

the oven drying assembly comprises an upper compartment and a lower compartment arranged apart, a plurality of first air nozzles being arranged on one side of the upper compartment facing the lower compartment, a plurality of second air nozzles being arranged on one side of the lower compartment facing the upper compartment; and the humidity detection module is positioned between the first air nozzles and the second air nozzles.

3. The electrode sheet oven drying apparatus according to claim 1, further comprising:

a fresh air pipe with one end connected to the circulating air pipe and another end communicated to outside.

4. The electrode sheet oven drying apparatus according to claim 1, further comprising:

a second air volume regulating valve installed in the circulating air pipe.

5. The electrode sheet oven drying apparatus according to claim 3, further comprising:

a third air volume regulating valve installed in the fresh air pipe.

6. The electrode sheet oven drying apparatus according to claim 1, further comprising:

a circulating fan installed on the circulating air pipe.

7. The electrode sheet oven drying apparatus according to claim 6, further comprising:

a heating module installed on the circulating air pipe.

8. A battery production device, comprising:

the electrode sheet oven drying apparatus according to claim 1; and a coating apparatus positioned upstream of the electrode sheet oven drying apparatus.

9. An electrode sheet oven drying method, comprising:

detecting a humidity in an accommodating cavity of the electrode sheet oven drying apparatus according to claim 1; and regulating a volume of steam discharged from the accommodating cavity according to the humidity in the accommodating cavity.

10. An electrode sheet oven drying apparatus, comprising:

an oven with an oven drying chamber;

an oven drying assembly positioned in the oven drying chamber;

an air discharge pipe connected to the oven drying chamber;

a first air volume regulating valve installed in the air discharge pipe;

a humidity detection module installed in the oven drying chamber, and configured to detect a humidity in the oven drying chamber;

a control module communicatively connected to the humidity detection module, and configured to regulate the first air volume regulating valve according to the humidity in the oven drying chamber;

a circulating air pipe with one end connected to the oven drying chamber and another end connected to the oven drying assembly;

a fresh air pipe with one end connected to the circulating air pipe and another end communicated to outside;

a second air volume regulating valve installed in the fresh air pipe; and a pressure difference detection module communicatively connected to the control module, the pressure difference detection module being configured to detect an air pressure in the oven drying chamber to control the second air volume regulating valve;

wherein the pressure difference detection module is provided with a first detection end and a second detection end, the first detection end extending into one end of the air discharge pipe connected to the oven drying chamber, the second detection end extending into one end of the circulating air pipe connected to the oven drying chamber, and the pressure difference detection module being configured to detect an air pressure difference between the end of the air discharge pipe connected to the oven drying chamber and the end of the circulating air pipe connected to the oven drying chamber.

* * * * *